(12) United States Patent
Chang et al.

(10) Patent No.: US 7,511,792 B2
(45) Date of Patent: Mar. 31, 2009

(54) IN-PLANE SWITCHING LIQUID CRYSTAL DISPLAY HAVING SIMPLE STRUCTURE

(75) Inventors: Jun Won Chang, Daejeon (KR); Byoung Kun Jeon, Daejeon (KR); Soo Jin Jang, Seoul (KR)

(73) Assignee: LG Chem, Ltd., Seoul (KR)

( * ) Notice: Subject to any disclaimer, the term of this patent is extended or adjusted under 35 U.S.C. 154(b) by 299 days.

(21) Appl. No.: 11/493,025

(22) Filed: Jul. 26, 2006

(65) Prior Publication Data

US 2007/0024792 A1 Feb. 1, 2007

(30) Foreign Application Priority Data

Jul. 29, 2005 (KR) .................. 10-2005-0069278

(51) Int. Cl.
  *G02F 1/1343* (2006.01)
(52) U.S. Cl. ............... 349/141; 349/96; 349/99; 349/102; 349/119; 349/41; 349/181
(58) Field of Classification Search ........... 349/41, 349/87, 96, 99, 102, 119, 141, 181
  See application file for complete search history.

(56) References Cited

U.S. PATENT DOCUMENTS

| 6,115,095 | A | 9/2000 | Suzuki et al. | 349/141 |
|---|---|---|---|---|
| 6,307,608 | B1 | 10/2001 | Sakamoto | 349/119 |
| 6,867,834 | B1 | 3/2005 | Coates et al. | 349/119 |
| 7,321,411 | B2 * | 1/2008 | Kim et al. | 349/118 |
| 2003/0122991 | A1 | 7/2003 | Itakura et al. | 349/43 |
| 2003/0193635 | A1 | 10/2003 | Mi et al. | 349/117 |
| 2004/0017532 | A1 * | 1/2004 | Ishikawa et al. | 349/141 |

(Continued)

FOREIGN PATENT DOCUMENTS

| JP | 2001-350022 | 12/2001 | ............. 349/119 X |
|---|---|---|---|
| WO | WO 2004/068223 A1 | 8/2004 | ............. 349/119 X |

(Continued)

OTHER PUBLICATIONS

James E. Anderson et al., "Methods and Concerns of Compensating In-Plane Switching Liquid Crystal Displays," Jpn. J. Appl. Phys. vol. 39 (2000) pp. 6388-6392.
Yukito Saitoh et al., "Optimum Film Compensation of Viewing Angle of Contrast in In-Plane-Switching-Mode Liquid Crystal Display," Jpn. J. Appl. Phys. vol. 37 (1998) pp. 4822-4828.

(Continued)

*Primary Examiner*—Brian M Healy
(74) *Attorney, Agent, or Firm*—McKenna Long & Aldridge LLP

(57) ABSTRACT

An IPS-LCD, in which the direction of an optical axis and retardation values are adjusted according to the disposition of a phase retardation film replacing one protective film, obtains a contrast ratio similar to that of an IPS-LCD having upper and lower protective films, and has a small thickness. The IPS-LCD includes first and second polarizing plates (1, 2), an IPS panel (3), and a first protective film. Absorption axes (4, 5) of the first and second polarizing plates (1, 2) are orthogonal to each other, and an optical axis of a liquid crystal in the IPS panel (3) and the absorption axis (4) are parallel with each other. A second phase retardation film, obtained by coating a biaxial film (17) with a uniaxial C film (11), is disposed between the second polarizing plate (2) and the IPS panel (3) and is used as a second protective film.

9 Claims, 23 Drawing Sheets

U.S. PATENT DOCUMENTS

| | | | |
|---|---|---|---|
| 2004/0160559 A1* | 8/2004 | Kim et al. | 349/117 |
| 2005/0128394 A1 | 6/2005 | Lee et al. | 349/119 |
| 2005/0190326 A1* | 9/2005 | Jeon et al. | 349/117 |
| 2006/0290853 A1* | 12/2006 | Hong et al. | 349/117 |
| 2007/0024792 A1* | 2/2007 | Chang et al. | 349/141 |

FOREIGN PATENT DOCUMENTS

| | | | |
|---|---|---|---|
| WO | WO 2004/090627 A1 | 10/2004 | 349/119 X |
| WO | WO 2005/038517 A1 | 4/2005 | 349/119 X |
| WO | WO 2005/065057 A2 | 7/2005 | 349/119 X |

OTHER PUBLICATIONS

Hiroyuki Mori et al., "Performance of a Novel Optical Compensation Film Based on Negative Birefringence of Discotic Compound for Wide-Viewing-Angle Twisted-Nematic Liquid-Crystal Displays," Jpn. J. Appl. Phys. vol. 36 (1997) pp. 143-147.

* cited by examiner

IN-PLANE SWITCHING LIQUID CRYSTAL DISPLAY HAVING SIMPLE STRUCTURE

This application claims the benefit of Korean Patent Application No. 10-2005-0069278, filed on Jul. 29, 2005, which is hereby incorporated by reference for all purposes as if fully set forth herein.

TECHNICAL FIELD

The present invention relates to a liquid crystal display, and more particularly to an in-plane switching liquid crystal display (hereinafter, referred to as an "IPS-LCD"), which is filled with a liquid crystal having positive dielectric constant anisotropy ($\Delta\epsilon > 0$).

BACKGROUND ART

In general, LCDs are divided into an in-plane switching (IPS)-LCD, a super in-plane switching (super IPS)-LCD, and a fringe field switching (FFS)-LCD according to modes of an active matrix driving electrode including pairs of electrodes. In the present invention, IPS-LCDs include the super IPS-LDS and the FFS-LCD.

FIG. 1 illustrates the basic structure of a conventional IPS-LCD. The IPS-LCD comprises a first polarizing plate 1, a second polarizing plate 2, and an IPS panel 3. An absorption axis 4 of the first polarizing plate 1 is orthogonal to an absorption axis 5 of the second polarizing plate 2, and is parallel with an optical axis 6 of a liquid crystal in the IPS panel 3.

Polarizing films in the first and second polarizing plates 1 and 2 are very thin and stretched films, thus being easily damaged by external physical and mechanical force. Accordingly, in order to protect the polarizing films of the first and second polarizing plates 1 and 2, a protective film is essentially formed on the internal surfaces of the first and second polarizing plates 1 and 2, on which the liquid crystal is formed.

In order to compensate for the light polarization of a polarizing plate to improve visibility and increase clearness of a screen, various phase retardation films are used. That is, in order to prevent light leakage and improve a contrast ratio, various phase retardation films or optical compensating films are used.

Accordingly, the polarizing plate includes various film layers, such as a polarizing film, a protective film for protecting the polarizing film, and a phase retardation film for improving optical characteristics of the polarizing plate. These various film layers increase the thickness of the polarizing plate.

This thick polarizing plate goes against the thin profile trend of the IPS-LCD. Thus, the improvement of the thick polarizing plate has been required.

In order to satisfy the above requirement, several techniques are proposed. According to one technique, the protective film is removed from the polarizing plate and the phase retardation film serves to protect the polarizing plate.

However, when the protective film is removed from the polarizing plate and the phase retardation film serves to protect the polarizing plate, the contrast ratio of the IPS-LCD is lowered. That is, the contrast ratio refers to a ratio of the luminance of the brightest portion to the luminance of the darkest portion. The higher a difference of luminances between the brightest portion and the darkest portion is, the higher the contrast ratio is. Accordingly, in order to assure the contrast ratio, it is necessary to prevent the light leakage at the darkest portion. When a phase retardation between the polarizing film and the phase retardation film is not properly controlled, the light leakage is severe according to viewable angles, thus causing a difficulty in assuring the contrast ratio.

Accordingly, an IPS-LCD comprising a polarizing plate, in which a phase retardation between a phase retardation film and a polarizing film is properly controlled, is required.

Particularly, the IPS-LCD has the worst contrast characteristic at a tilt angle of 75°. The improvement of the contrast characteristic of the IPS-LCD at a tilt angle of 75° means the improvement of the contrast characteristics of the IPS-LCD at all viewable angles. Thus, it is necessary to set the contrast characteristic of the IPS-LCD at tilt angle of 75° to more than a sufficient value.

For the above reason, a protective film is provided on the inner surfaces of the first and second polarizing plates of the IPS-LCD. In this case, the contrast ratio of the IPS-LCD is 10:1~45:1. Consequently, it is preferable that an LCD having a contrast ratio similar to the above range and a simple structure is developed.

DISCLOSURE

[Technical Problem]

Therefore, the present invention has been made in view of the above problems, and it is an object of the present invention to provide an IPS-LCD, in which the direction of an optical axis and retardation values are adjusted according to the disposition order of a phase retardation film even when a protective film is removed from an internal surface of one polarizing plate, thus obtaining a contrast ratio similar to that of an IPS-LCD having upper and lower protective films, and having a small thickness.

[Technical Solution]

In accordance with an aspect of the present invention, the above and other objects can be accomplished by the provision of an in-plane switching liquid crystal display (IPS-LCD) comprising a first polarizing plate, a second polarizing plate, an horizontally oriented EPS panel disposed between the first and second polarizing plates and filled with a liquid crystal having positive dielectric constant anisotropy ($\Delta\epsilon > 0$), and a first protective film disposed between the first polarizing plate and the IPS panel, in which an absorption axis of the first polarizing plate and an absorption axis of the second polarizing plate are orthogonal to each other, and an optical axis of the liquid crystal in the IPS panel and the absorption axis of the first polarizing plate are parallel with each other, wherein a second phase retardation film, obtained by coating a biaxial film with a uniaxial C film, is disposed between the second polarizing plate and the EPS panel and is used as a second protective film between the IPS panel and the second polarizing plate.

Thereby, the second phase retardation film plays an original role of increasing a viewable angle, and further serves as the protective film of the second polarizing plate. That is, it is possible to omit one protective film, thus reducing the thickness of the IPS-LCD, simplifying the structure of the IPS-LCD, and reducing the production costs of the IPS-LCD.

The IPS-LCD may further comprise a first phase retardation film including a uniaxial A film and disposed between the IPS panel and the first polarizing film.

Preferably, the first phase retardation film including the uniaxial A film has an in-plane retardation value (Rin) of 30~450 nm, the biaxial film of the second phase retardation film has an in-plane retardation value (Rin) of 50~150 nm and a thickness retardation value (Rth) of −50~150 nm, and the uniaxial C film of the second phase retardation film has a thickness retardation value (Rth) of 50~170 nm. Here, the above retardation values denote retardation values at a wavelength of 550 nm.

In accordance with another aspect of the present invention, there is provided an in-plane switching liquid crystal display (IPS-LCD) comprising a first polarizing plate, a second polarizing plate, horizontally oriented IPS panel disposed between the first and second polarizing plates and filled with a liquid crystal having positive dielectric constant anisotropy ($\Delta\epsilon>0$), and a first protective film disposed between the first polarizing plate and the IPS panel, in which an absorption axis of the first polarizing plate and an absorption axis of the second polarizing plate are orthogonal to each other, and an optical axis of the liquid crystal in the IPS panel and the absorption axis of the first polarizing plate are parallel with each other, wherein a second phase retardation film, obtained by coating a uniaxial A film with a uniaxial C film, is disposed between the second polarizing plate and the IPS panel and is used as a second protective film between the IPS panel and the second polarizing plate, and a first phase retardation film including a uniaxial A film is disposed between the IPS panel and the first polarizing film.

Thereby, the second phase retardation film plays an original role of increasing a viewable angle, and further serves as the protective film of the second polarizing plate. That is, it is possible to omit one protective film, thus reducing the thickness of the IPS-LCD, simplifying the structure of the IPS-LCD, and reducing the production costs of the IPS-LCD.

Preferably, the first phase retardation film including the uniaxial A film has an in-plane retardation value (Rin) of 30~450 nm, the uniaxial A film of the second phase retardation film has an in-plane retardation value (Rin) of 80~150 nm, and the uniaxial C film of the second phase retardation film has a thickness retardation value (Rth) of 50~170 nm. Here, the above retardation values denote retardation values at a wavelength of 550 nm.

Further, preferably, an optical axis of the first phase retardation film in the direction of the X axis is parallel with the absorption axis of the first polarizing plate.

The first protective film is preferably one film selected from the group consisting of a non-stretched zero COP film, a non-stretched zero TAC film, and a TAC film having a thickness of 50 μm and having a thickness retardation value, and more preferably a non-stretched zero TAC film. The thickness retardation value of the TAC film is 30~40 nm.

Preferably, the uniaxial A film is made of lengthwise stretched polymer, the biaxial film is made of crosswise stretched polymer, and the uniaxial C film is obtained by coating an orientation film with a liquid crystal and hardening the liquid crystal coated on the orientation film. However, the uniaxial C film may be made of a non-orientation film.

[Advantageous Effects]

The present invention provides an in-plane switching liquid crystal display (IPS-LCD), which uses a second phase retardation film exhibiting a broad viewable angle property as a protective film of one polarizing plate. The IPS-LCD of the present invention has a thin profile and a simple structure, and causes the reduction of the production costs thereof.

The conventional IPS-LCD having upper and lower protective films exhibits a contrast ratio of 10:1~45:1. On the other hand, the IPS-LCD of the present invention exhibits a contrast ratio of 25:1~55:1. Accordingly, the IPS-LCD of the present invention has a simple structure and exhibits a reasonably high contrast ratio.

DESCRIPTION OF DRAWINGS

The above and other objects, features and other advantages of the present invention will be more clearly understood from the following detailed description taken in conjunction with the accompanying drawings, in which.

MODE FOR INVENTION

Now, preferred embodiments of the present invention will be described in detail with reference to the annexed drawings.

Figure 2:
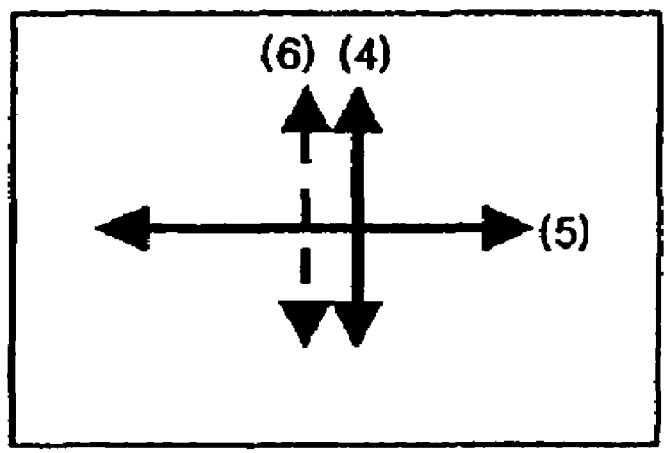
FIG. 2 is a view illustrating the disposition of absorption axes of two polarizing plates and an optical axis of an IPS panel of the IPS-LCD of FIG. 1.

FIG. 2 illustrates an absorption axis 6 of a liquid crystal in an IPS panel 3 and absorption axes 4 and 5 two polarizing plates 1 and 2. The absorption axis 4 of the first polarizing plate 1 is orthogonal to the absorption axis 5 of the second polarizing plate 2, and is parallel with the optical axis 6 of the liquid crystal in the IPS panel 6.

Figure 1:
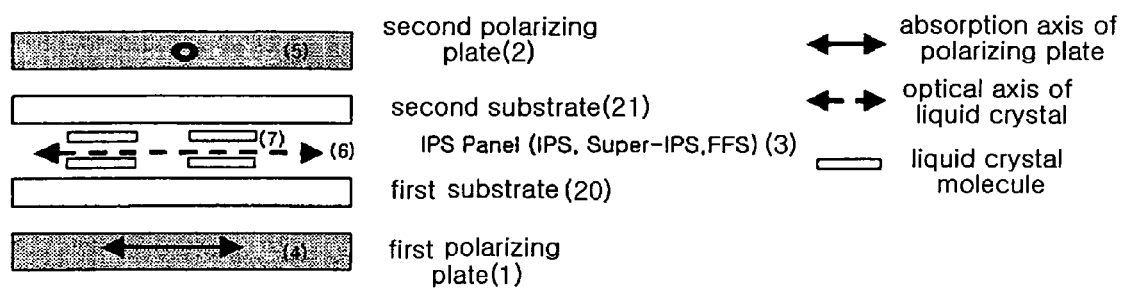
FIG. 1 is a schematic view illustrating the basic structure of a conventional IPS-LCD.

With reference to FIGS. 1 and 2, the FPS panel 3 interposed between two polarizing plates 1 and 2, the absorption axes 4 and 5 of which are orthogonal to each other, comprises liquid molecules 7, which are disposed in parallel with first and second substrates 20 and 21 and arranged in the direction of rubbing (a method for treating the surface of the panel for arranging the liquid crystal modules in one direction). When the absorption axis of the polarizing plate adjacent to a backlighting and the rubbing direction are parallel with each other, the IPS-LCD is referred to as an "O-mode IPS-LCD", and when the absorption axis of the polarizing plate adjacent to the backlighting and the rubbing direction are orthogonal to each other, the IPS-LCD is referred to as an "E-mode IPS-LCD".

Figure 3:
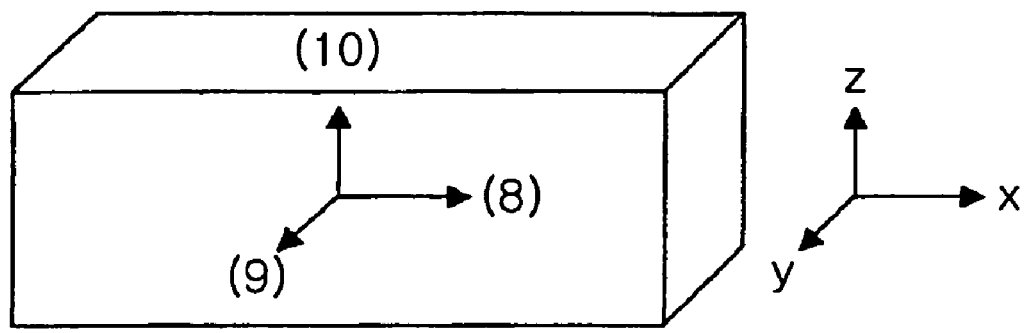
FIG. 3 is a view illustrating the refractivities of a phase retardation film of the IPS-LCD.

FIG. 3 is a view illustrating the refractivities of a phase retardation film for compensating for the viewable angle of the IPS-LCD. $n_x$ represents the refractivity 8 of the phase retardation film in the direction of the X-axis, $n_y$ represents the refractivity 9 of the phase retardation film in the direction of the Y-axis, and $n_z$ represents the refractivity 10 of the phase retardation film in the direction of the Z-axis. The characteristics of the phase retardation film are determined by the degrees of the refractivities. A phase retardation film, in which the refractivities in the directions of the two axes are different, is referred to as a uniaxial phase retardation film, and a phase retardation film, in which the refractivities in the directions of the three axes are different, is referred to as a biaxial phase retardation film.

The uniaxial phase retardation film and the biaxial phase retardation film are defined as below equations.

(1) When a phase retardation film satisfies the expression of $n_x > n_y = n_z$, the phase retardation film is referred to as a uniaxial A film, and an in-plane retardation value is defined using a difference $(n_x - n_y)$ between two refractivities located on a plane and a thickness (d) of the film by the below equation 1.

$$Rin = d \times (n_x - n_y) \qquad \text{[Equation 1]}$$

(2) When a phase retardation film satisfies the expression of $n_x = n_y < n_z$, the phase retardation film is referred to as a uniaxial C film, and a thickness retardation value is defined using a difference $(n_z - n_y)$ between the refractivity located on a plane and the refractivity in the thickness direction and a thickness (d) of the film by the below equation 2.

$$Rth = d \times (n_z - n_y) \qquad \text{[Equation 2]}$$

(3) When a phase retardation film satisfies the expression of $n_x > n_y > n_z$, the phase retardation film is referred to as a negative biaxial phase retardation film (hereinafter, referred to as a "biaxial phase retardation film"). Since the refractivities in the directions of the three axes are different, the biaxial phase retardation film has an in-plane retardation value and a thickness retardation value, which are defined by the above equations 1 and 2, respectively.

The retardation values are affected by the wavelength of light to be used. The wavelength of light is 550 nm except being specially defined.

FIGS. 4 to 8 illustrate structures of IPS-LCDs, each of which has a second phase retardation film, obtained by coating a biaxial film 17 with a uniaxial C film 11, between a second polarizing plate 2 and an IPS-panel 3, in accordance with embodiments of the present invention. Further, FIGS. 9 to 12 illustrate structures of IPS-LCDs, each of which has a second phase retardation film, obtained by coating a uniaxial A film 14 with a uniaxial C film 11, between a second polarizing plate 2 and an IPS-panel 3, in accordance with other embodiments of the present invention.

Each of the IPS-LCDs, shown in FIGS. 4 to 12, comprises a protective film, for protecting a polarizing device made of stretched polyvinyl alcohol, on the internal surface of a first polarizing plate 1. The protective film is made of TAC (triacetate cellulose) of a thickness of 50 μm having a thickness retardation value, biaxial COP (cyclo-olefin) simultaneously having an in-plane retardation value and a thickness retardation value, TAC without a thickness retardation value (hereinafter, referred to as "zero TAC"), or COP without a thickness retardation value (hereinafter, referred to as "zero COP").

Preferably, the uniaxial A films 12 and 14 are made of lengthwise stretched polymer, the biaxial film 17 is made of crosswise stretched polymer, and the uniaxial C film 11 is obtained by coating an orientation film with a liquid crystal and hardening the liquid crystal coated on the orientation film.

Figure 4:
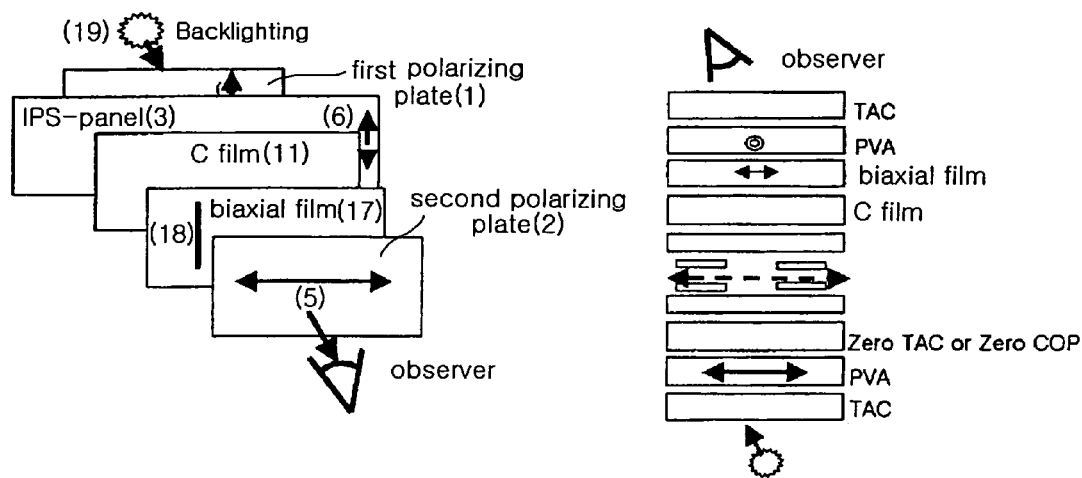
FIGS. 4 to 8 are schematic views illustrating structures of IPS-LCDs, each of which has a second phase retardation film, obtained by coating a biaxial film with a uniaxial C film, between a second polarizing plate and an IPS panel, in accordance with embodiments of the present invention.
Figure 5:
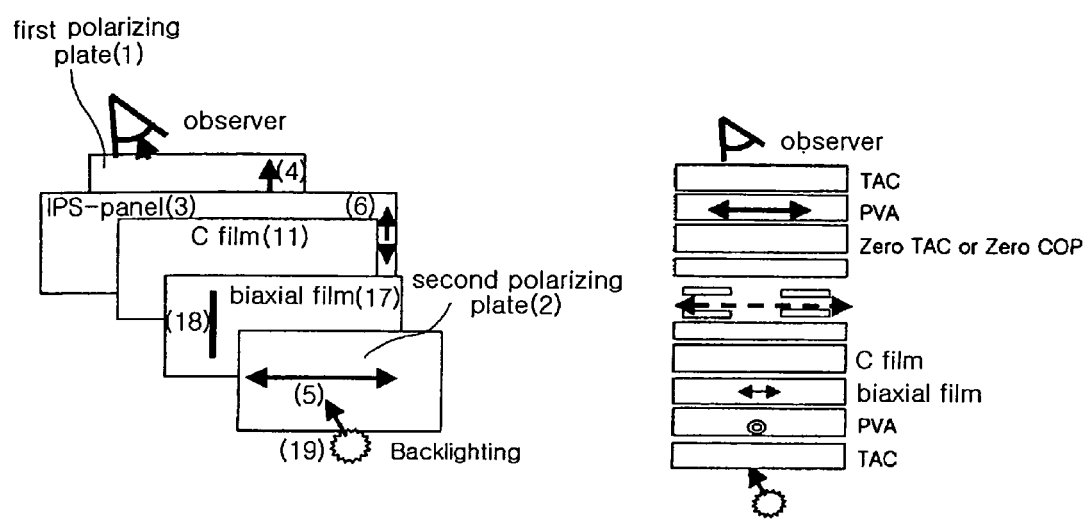
Figure 6:
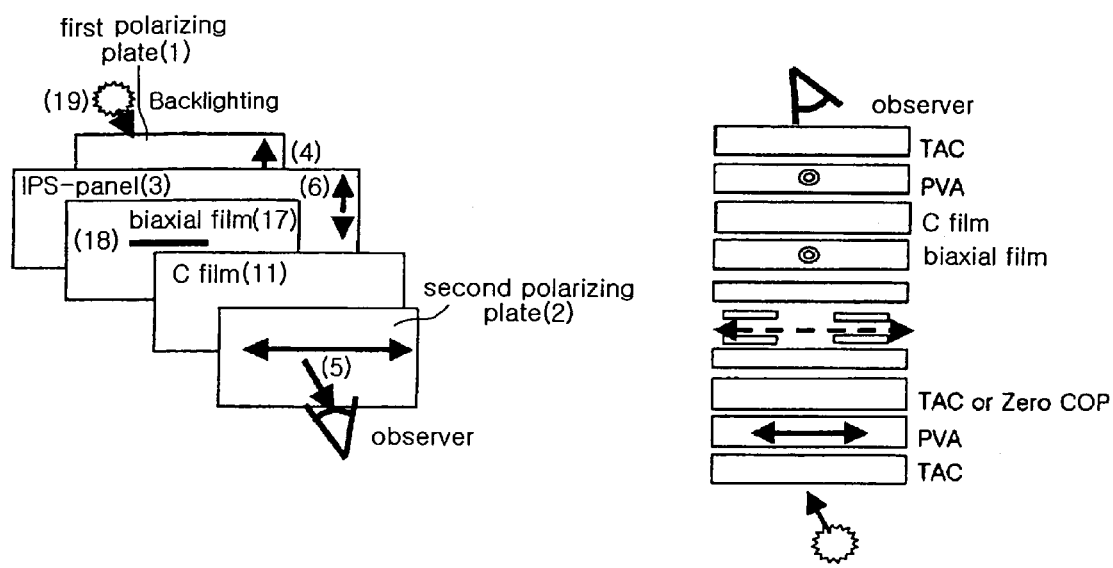
Figure 7:
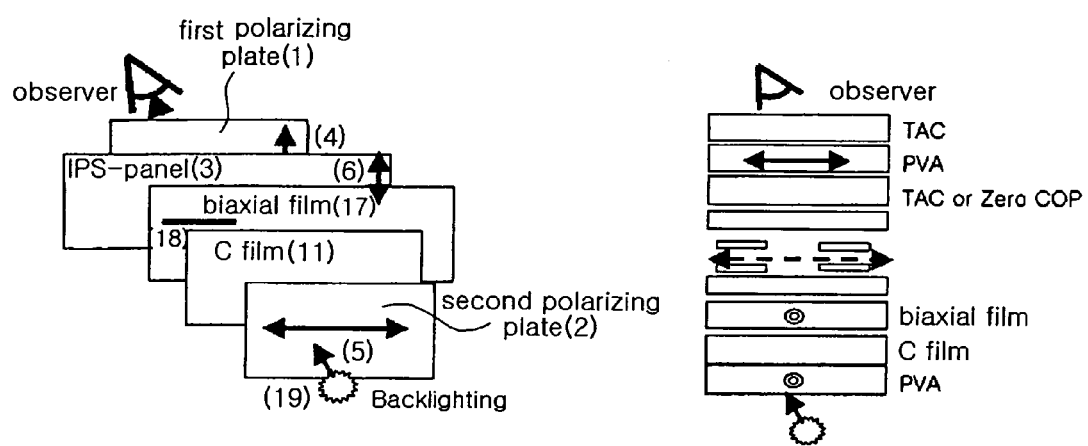

Here, the stacking structures of the IPS-LCDs of FIGS. 4 and 5 and the structures of the IPS-LCDs of FIGS. 6 and 7 are the same except that the positions of an observer and a backlighting 19 are reversed. As described above, when the absorption axis of the polarizing plate adjacent to the backlighting 19 and the rubbing direction are parallel with each other, the IPS-LCD is referred to as an "O-mode IPS-LCD", and when the absorption axis of the polarizing plate adjacent to the backlighting 19 and the rubbing direction are orthogonal to each other, the IPS-LCD is referred to as an "E-mode IPS-LCD". The IPS-LCDs, as shown in FIGS. 4, 6, 8, 9, and 11, are O-mode IPS-LCDs, and the IPS-LCDs, as shown in FIGS. 5, 7, 10, and 12 are E-mode IPS-LCDs. The IPS-LCDs of FIGS. 4 and 5, the IPS-LCDs of FIGS. 6 and 7, the IPS-LCDs of FIGS. 9 and 10, and the IPS-LCDs of FIGS. 11 and 12 have the same structure except that one IPS-LCD is an O-mode IPS-LCD and the other IPS-LCD is an E-mode IPS-LCD, and will be thus described simultaneously.

FIGS. 4 and 5 illustrate structures of IPS-LCDs, each of which has a phase retardation film, in accordance with first and second embodiments of the present invention. Here, the optical axis 18 of the biaxial film 17 is orthogonal to the absorption axis 5 of the second polarizing plate 2, and is located at a position adjacent to the second polarizing plate 2. Further, the uniaxial C film 11 is located at a position adjacent to the IPS-panel 3.

FIGS. 6 and 7 illustrate structures of IPS-LCDs, each of which has a phase retardation film, in accordance with third and fourth embodiments of the present invention. Here, the optical axis 18 of the biaxial film 17 is parallel with the absorption axis 5 of the second polarizing plate 2, and is located at a position adjacent to the IPS-panel 3. Further, the uniaxial C film 11 is located at a position adjacent to the second polarizing plate 2.

Figure 8:
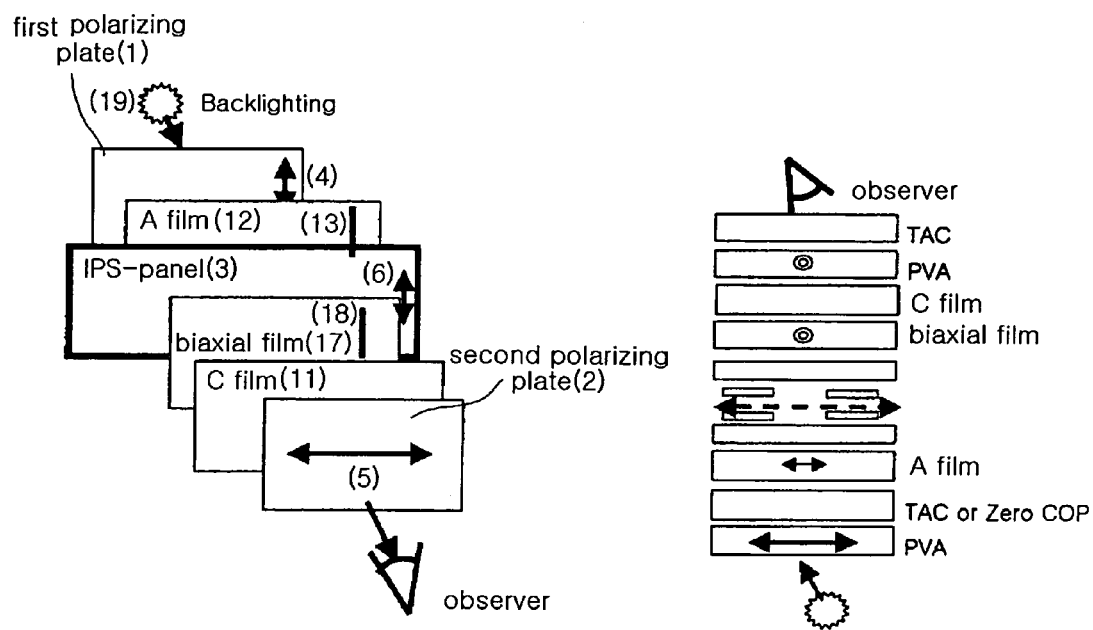

FIG. 8 illustrates a structure of an IPS-LCD, which has a phase retardation film, in accordance with a fifth embodiment of the present invention. Here, the optical axis 18 of the biaxial film 17 and the optical axis 13 of the uniaxial A film 12 are orthogonal to the absorption axis 5 of the second polarizing plate 2. The uniaxial C film 11 is located at a position adjacent to the second polarizing plate 2, and the biaxial film 17 is located at a position adjacent to the IPS-panel 3. Further, the uniaxial A film 12 is located between the first polarizing plate 1 and the IPS-panel 3.

Figure 9:
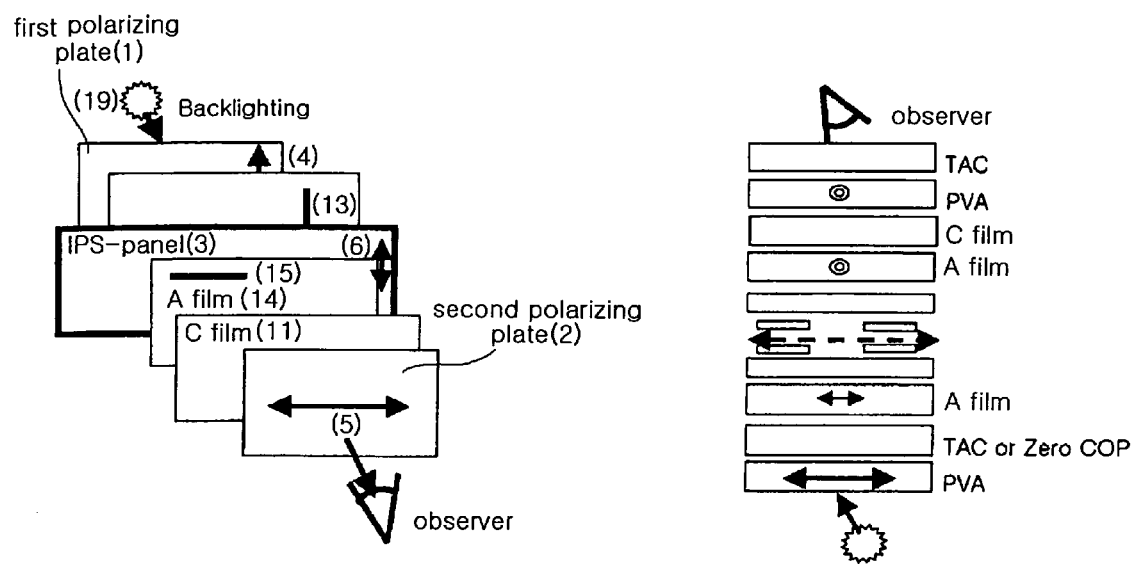
FIGS. 9 to 12 are schematic views illustrating structures of IPS-LCDs, each of which has a second phase retardation film, obtained by coating a uniaxial A film with a uniaxial C film, between a second polarizing plate and an IPS panel, in accordance with other embodiments of the present invention.
Figure 10:
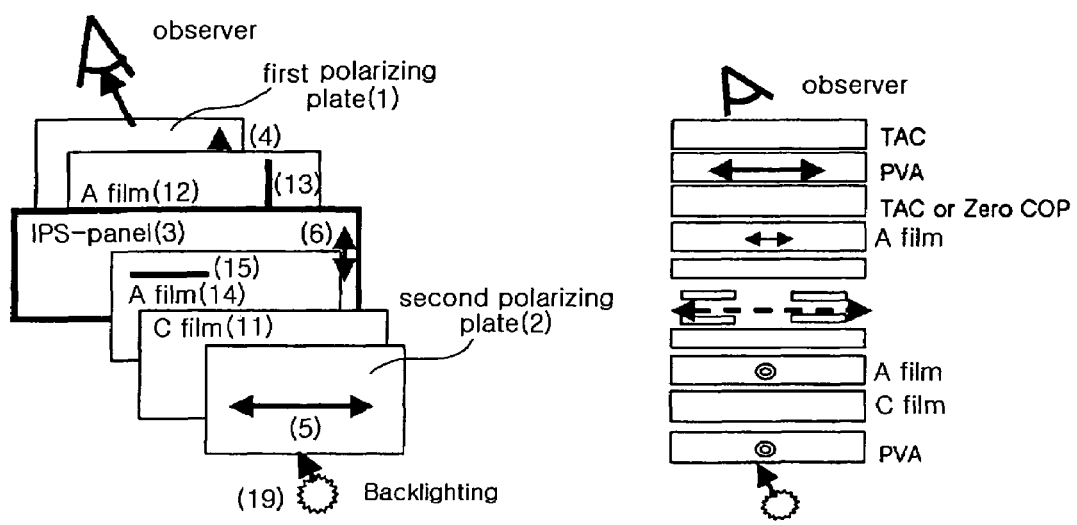

FIGS. 9 and 10 illustrate structures of IPS-LCDs, each of which has a phase retardation film, in accordance with sixth and seventh embodiments of the present invention. Here, the optical axis 13 of one uniaxial A film 12 adjacent to the first polarizing plate 1 is orthogonal to the absorption axis 5 of the second polarizing plate 2, and the optical axis 15 of the other uniaxial A film 14 is parallel with the absorption axis 5 of the second polarizing plate 2. The uniaxial C film 11 is located at a position adjacent to the second polarizing plate 2, and the uniaxial A film 14 is located at position adjacent to the IPS-panel 3. Further, the uniaxial A film 12 is located between the first polarizing plate 1 and the IPS-panel 3.

Figure 11:
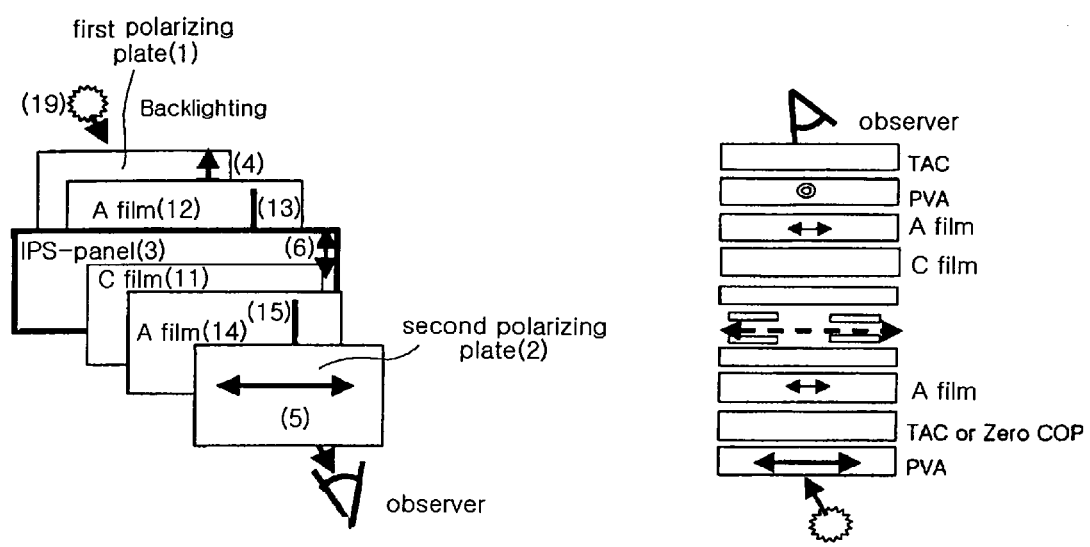
Figure 12:
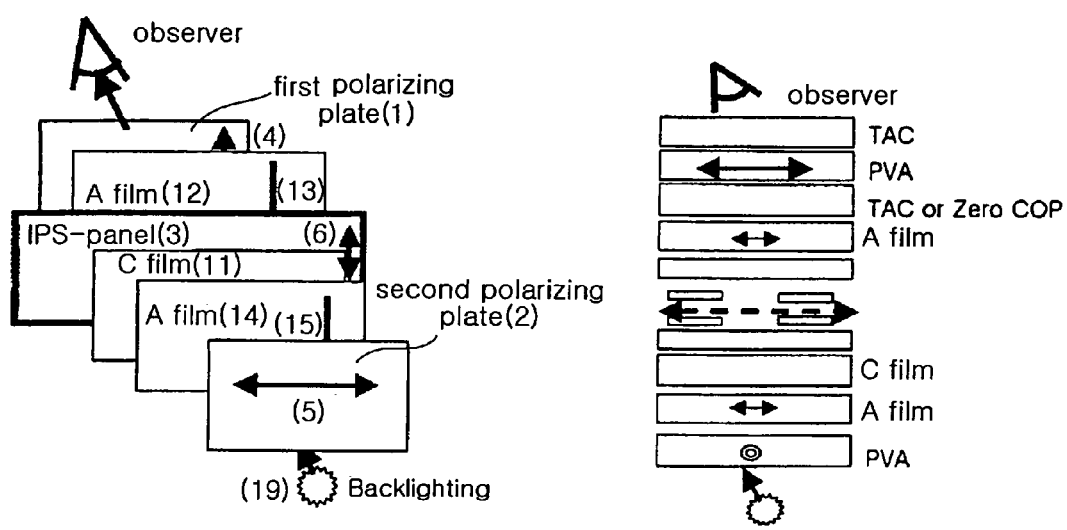

FIGS. 11 and 12 illustrate structures of IPS-LCDs, each of which has a phase retardation film, in accordance with eighth and ninth embodiments of the present invention. Here, the optical axis 13 of one uniaxial A film 12 adjacent to the first polarizing plate 1 and the optical axis 15 of the other uniaxial A film 14 adjacent to the second polarizing plate 2 are orthogonal to the absorption axis 5 of the second polarizing plate 2. The uniaxial A film 14 is located at position adjacent to the second polarizing plate 2, and the uniaxial C film 11 is located at a position adjacent to the IPS-panel 3. Further, the uniaxial A film 12 is located between the first polarizing plate 1 and the IPS-panel 3.

Embodiments

Each of the IPS-LCDs in accordance with all the below embodiments of the present invention comprises an IPS panel including liquid crystal cells, which have a cell interval of 3.3 μm and are filled with a liquid crystal having a pretilt angle of 1.4°, dielectric constant anisotropy ($\Delta\epsilon$=+7), and birefiingence ($\Delta n$=0.1) at a wavelength of 550 nm.

First, in order to determine whether or not the IPS-LCDs have a proper contrast ratio when an internal protective film is replaced with a phase retardation film, polarizing plates were manufactured by methods stated in the first to ninth embodiments of the present invention, and results were obtained by simulation.

First Embodiment

In the IPS-LCD of the first embodiment, as shown in FIG. 4, the internal protective film of the first polarizing plate 1 was made of zero COP or zero TAC. The internal protective film of the second polarizing plate 2 was replaced with a phase retardation film obtained by coating the upper surface of the biaxial film 17, which has a thickness of 80 μm, an in-plane retardation value (Rin) of 90 nm, and a thickness retardation value (Rth) of −75 nm, with the C film 11, which has a thickness retardation value (Rth) of 140 nm. When the above obtained phase retardation film and the polarizing plates 1 and 2 were applied to an IPS-LCD, the simulated minimum contrast ratios of a tilt angle of 75° to all azimuthal angles in the IPS-LCD were 45:1.

Figure 13:
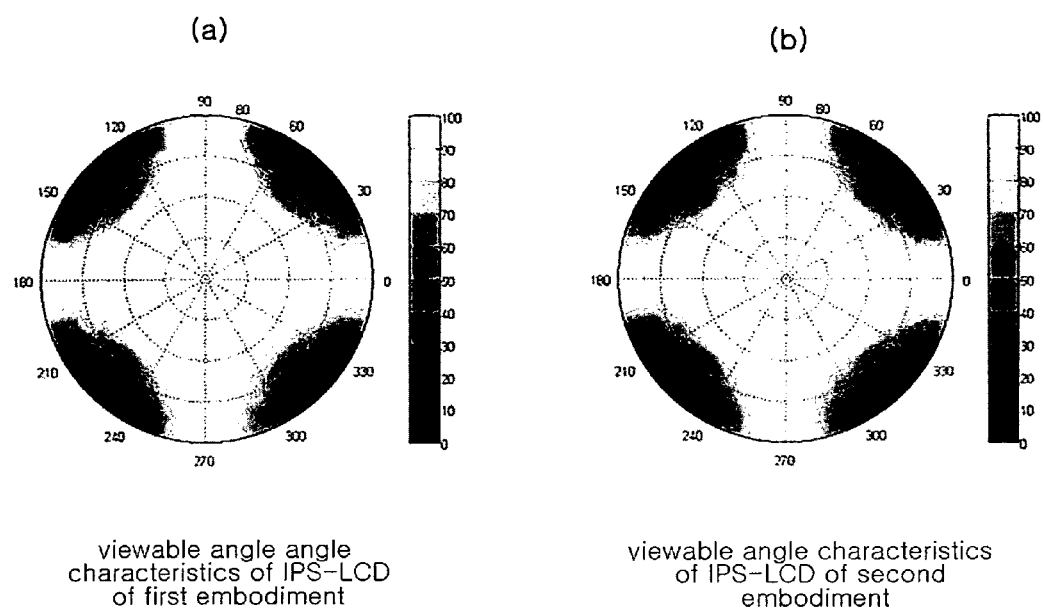
FIGS. 13A and 13B are views illustrating viewable angle characteristics of the IPS-LCDs in accordance with the first and second embodiments, as shown in FIGS. 4 and 5.

FIG. 13A illustrates contrast characteristics of tilt angles of 0~80° to all azimuthal angles under the above conditions. Here, the center of a circle represents contrast characteristics at a tilt angle of 0°, and the circumference of the circle represents contrast characteristics at a tilt angle of 80°. The larger the radius of the circle is, the larger the tilt angle is. Values 0~330, which are written along the circumference of the circle, denote azimuthal angles.

Below Table 1 states simulated results showing viewable angle characteristics at a tilt angle of 75° according to retardation values of the internal protective film and the phase retardation film in the structure of the IPS-LCD of the first embodiment.

TABLE 1

| Internal protective film of 1st polarizing plate | IPS-LCD | Retardation value of C film | Retardation value of B film | Internal protective film of 2nd polarizing plate | Minimum contrast ratio |
|---|---|---|---|---|---|
| Zero COP or zero TAC film | 330 nm | Rth = 50 nm | Rin = 90 nm, Rth = −50 nm | B film + C film | 45:1 |
| | | Rth = 60 nm | Rin = 90 nm, Rth = −70 nm | | |
| | | Rth = 80 nm | Rin = 90 nm, Rth = −100 nm | | |
| | | Rth = 100 nm | Rin = 90 nm, Rth = −120 nm | | |
| | | Rth = 126 nm | Rin = 90 nm, Rth = −150 nm | | |
| | | Rth = 50 nm | Rin = 70 nm, Rth = −50 nm | | |
| | | Rth = 80 nm | Rin = 70 nm, Rth = −90 nm | | |
| | | Rth = 110 nm | Rin = 70 nm, Rth = −120 nm | | |
| | | Rth = 132 nm | Rin = 70 nm, Rth = −150 nm | | |
| | | Rth = 35 nm | Rin = 110 nm, Rth = −50 nm | | |
| | | Rth = 60 nm | Rin = 110 nm, Rth = −80 nm | | |
| | | Rth = 100 nm | Rin = 110 nm, Rth = −130 nm | | |
| | | Rth = 140 nm | Rin = 90 nm, Rth = −75 nm | | |

Second Embodiment

In the IPS-LCD of the second embodiment, as shown in FIG. 5, the internal protective film of the first polarizing plate 1 and the internal protective film of the second polarizing plate 2 were the same as those of the first embodiment, but have retardation values different from those of the first embodiment. That is, in the IPS-LCD of the second embodiment, as shown in FIG. 5, the internal protective film of the first polarizing plate 1 was made of zero COP or zero TAC. The internal protective film of the second polarizing plate 2 was replaced with a phase retardation film obtained by coating the upper surface of the biaxial film 17, which has a thickness of 100 μm, an in-plane retardation value (Rin) of 90 nm, and a thickness retardation value (Rth) of −100 nm, with the C film 11, which has a thickness retardation value (Rth) of 115 nm. When this phase retardation film and the polarizing plates 1 and 2 were applied to an IPS-LCD, the simulated minimum contrast ratios of a tilt angle of 75° to all azimuthal angles in the IPS-LCD were 40:1.

FIG. 13B illustrates contrast characteristics of tilt angles of 0~80° to all azimuthal angles under the above conditions.

Below Table 2 states simulated results showing viewable angle characteristics at a tilt angle of 75° according to retardation values of the internal protective film and the phase retardation film in the structure of the IPS-LCD of the second embodiment.

TABLE 2

| Internal protective film of 1st polarizing plate | IPS-LCD | Retardation value of C film | Retardation value of B film | Internal protective film of 2nd polarizing plate | Minimum contrast ratio |
|---|---|---|---|---|---|
| Zero COP or zero TAC film | 330 nm | Rth = 115 nm | Rin = 90 nm, Rth = −100 nm | B film + C film | 40:1 |
| | | Rth = 130 nm | Rin = 90 nm, Rth = −120 nm | | |
| | | Rth = 160 nm | Rin = 90 nm, Rth = −150 nm | | |
| | | Rth = 130 nm | Rin = 70 nm, Rth = −120 nm | | |
| | | Rth = 160 nm | Rin = 70 nm, Rth = −150 nm | | |
| | | Rth = 140 nm | Rin = 110 nm, Rth = −130 nm | | |

Third Embodiment

In the IPS-LCD of the third embodiment, as shown in FIG. 6, the internal protective film of the first polarizing plate 1 was a zero COP film or a zero TAC film. The internal protective film of the second polarizing plate 2 was replaced with a phase retardation film obtained by coating the upper surface of the biaxial film 17, which has a thickness of 80 μm, an in-plane retardation value (Rin) of 90 nm, and a thickness retardation value (Rth) of −75 nm, with the C film 11, which has a thickness retardation value (Rth) of 130 nm. When the above obtained phase retardation film and the polarizing plates 1 and 2 were applied to an IPS-LCD, the simulated minimum contrast ratios of a tilt angle of 75° to all azimuthal angles in the IPS-LCD were 35:1~45:1. After the upper surface of the biaxial phase retardation film 17 is coated with the C film 11, a film made of zero TAC without a retardation value may be additionally stacked thereon. The IPS-LCD of this embodiment differs from the conventional IPS-LCD using TAC having a retardation value in that the EPS-LCD of this embodiment uses zero TAC without a retardation value. The contrast ratio of the IPS-LCD having the phase retardation film of the second polarizing plate, which includes the film made of zero TAC, is the same as the IPS-LCD having the phase retardation film of the second polarizing plate, which does not include the film made of zero TAC (The film made of zero TAC is applied to third to seventh embodiments).

Figure 14:
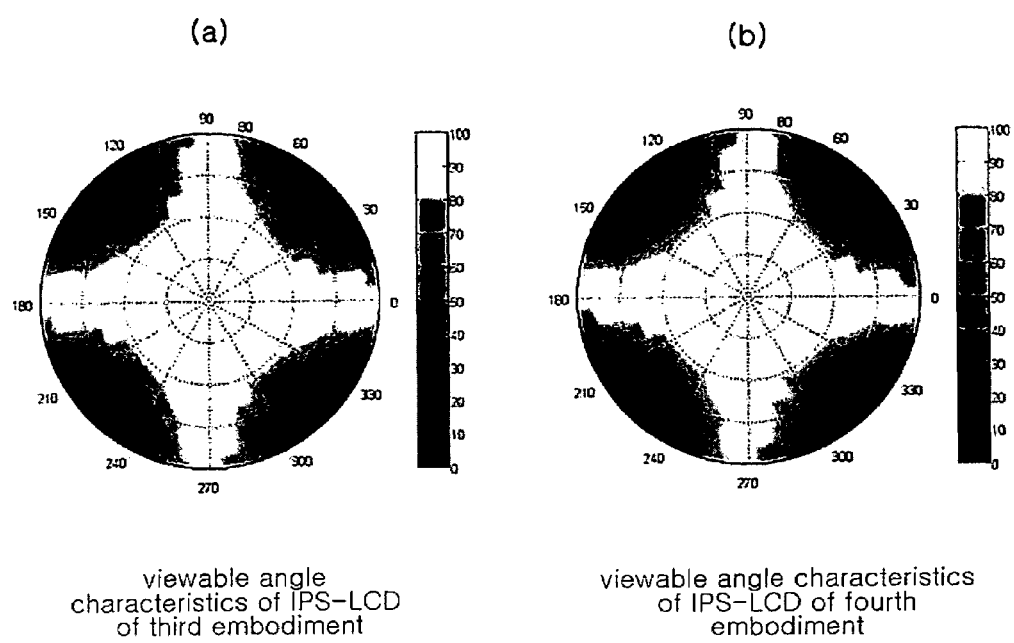
FIGS. 14A and 14B are views illustrating viewable angle characteristics of the IPS-LCDs in accordance with the third and fourth embodiments, as shown in FIGS. 6 and 7.

FIG. 14A illustrates contrast characteristics of tilt angles of 0~80° to all azimuthal angles under the above conditions.

Below Table 3 states simulated results showing viewable angle characteristics at a tilt angle of 75° according to retardation values of the internal protective film and the phase retardation film in the structure of the IPS-LCD of the third embodiment.

TABLE 3

| Internal protective film of 1st polarizing plate | IPS-LCD | Retardation value of B film | Retardation value of C film | Internal protective film of 2nd polarizing plate | Minimum contrast ratio |
|---|---|---|---|---|---|
| TAC film having thickness of 50 μm | 330 nm | Rin = 70 nm, Rth = −90 nm | Rth = 66 nm | B film + C film (+zero TAC film) | 35:1 |
| | | Rin = 70 nm, Rth = −120 nm | Rth = 90 nm | | |
| | | Rin = 90 nm, Rth = −100 nm | Rth = 70 nm | | |
| | | Rin = 90 nm, Rth = −120 nm | Rth = 80 nm | | |
| | | Rin = 90 nm, Rth = −150 nm | Rth = 110 nm | | |
| | | Rin = 110 nm, Rth = −80 nm | Rth = 45 nm | | |
| | | Rin = 110 nm, Rth = −120 nm | Rth = 70 nm | | |
| | | Rin = 110 nm, Rth = −150 nm | Rth = 100 nm | | |
| Zero COP or zero TAC film | | Rin = 110 nm, Rth = −150 nm | Rth = 125 nm | | 45:1 |
| | | Rin = 110 nm, Rth = −120 nm | Rth = 100 nm | | |
| | | Rin = 110 nm, Rth = −80 nm | Rth = 70 nm | | |
| | | Rin = 90 nm, Rth = −150 nm | Rth = 132 nm | | |
| | | Rin = 90 nm, Rth = −120 nm | Rth = 110 nm | | |
| | | Rin = 90 nm, Rth = −50 nm | Rth = 55 nm | | |
| | | Rin = 70 nm, Rth = −90 nm | Rth = 90 nm | | |
| | | Rin = 90 nm, Rth = −75 nm | Rth = 130 nm | | |

Fourth Embodiment

In the IPS-LCD of the fourth embodiment, as shown in FIG. 7, the internal protective film of the first polarizing plate 1 and the internal protective film of the second polarizing plate 2 were the same as those of the third embodiment, but have retardation values different from those of the third embodiment. That is, in the IPS-LCD of the fourth embodiment, as shown in FIG. 7, the internal protective film of the first polarizing plate 1 was a zero COP film or a zero TAC film. The internal protective film of the second polarizing plate 2 was replaced with a phase retardation film obtained by coating the upper surface of the biaxial film 17, which has a thickness of 100 μm, an in-plane retardation value (Rin) of 90 nm, and a thickness retardation value (Rth) of −150 nm, with the C film 11, which has a thickness retardation value (Rth) of 150 nm. When this phase retardation film and the polarizing plates 1 and 2 were applied to an IPS-LCD, the simulated minimum contrast ratios of a tilt angle of 75° to all azimuthal angles in the IPS-LCD were 25:1~30:1.

FIG. 14B illustrates contrast characteristics of tilt angles of 0~80° to all azimuthal angles under the above conditions.

Below Table 4 states simulated results showing viewable angle characteristics at a tilt angle of 75° according to retardation values of the internal protective film and the phase retardation film in the structure of the IPS-LCD of the fourth embodiment.

TABLE 4

| Internal protective film of 1st polarizing plate | IPS-LCD | Retardation value of B film | Retardation value of C film | Internal protective film of 2nd polarizing plate | Minimum contrast ratio |
|---|---|---|---|---|---|
| TAC film having thickness of 50 μm | 330 nm | Rin = 90 nm, Rth = −150 nm<br>Rin = 110 nm, Rth = −150 nm | Rth = 150 nm<br>Rth = 100 nm | B film + C film (+zero TAC film) | 25:1 | upper surface of the biaxial film 17 is coated with the C film 11, a film made of zero TAC without a retardation value may be additionally stacked thereon.

Figure 15:
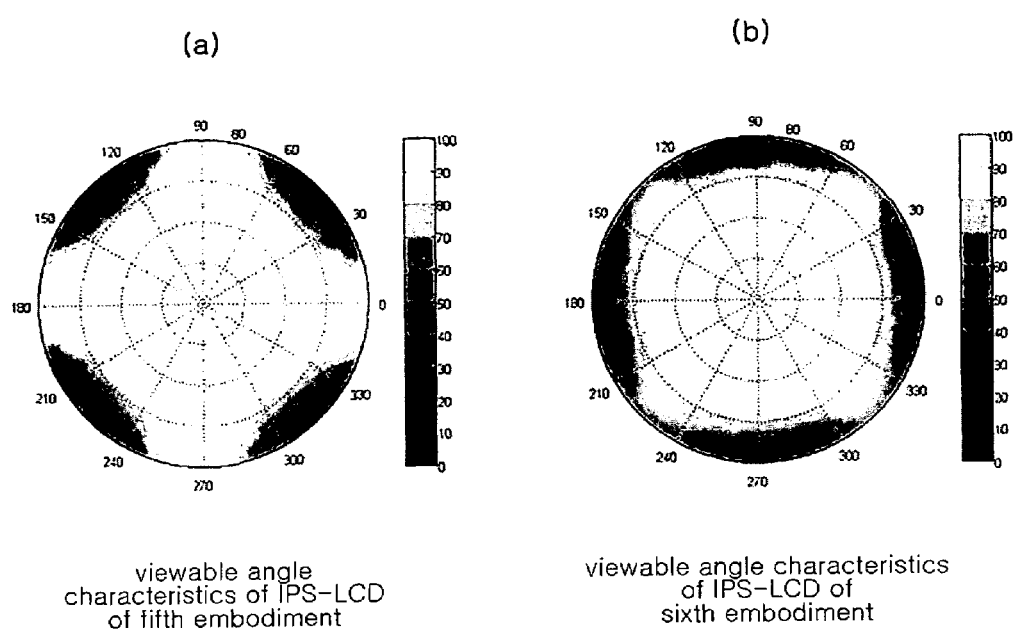
FIGS. 15A and 15B are views illustrating viewable angle characteristics of the IPS-LCDs in accordance with the fifth and sixth embodiments, as shown in FIGS. 8 and 9.

FIG. 15A illustrates contrast characteristics of tilt angles of 0~80° to all azimuthal angles under the above conditions.

Below Table 5 states simulated results showing viewable angle characteristics at a tilt angle of 75° according to retardation values of the internal protective film and the phase retardation film in the structure of the IPS-LCD of the fifth embodiment.

TABLE 5

| Internal protective film of 1st polarizing plate | Retardation value of A film (1st polarizing plate side) | IPS-LCD | Retardation value of B film | Retardation value of C film | Internal protective film of 2nd polarizing plate | Minimum contrast ratio |
|---|---|---|---|---|---|---|
| TAC film having thickness of 50 μm | Rin = 100 nm<br>Rin = 90 nm<br>Rin = 120 nm<br>Rin = 100 nm<br>Rin = 70 nm<br>Rin = 150 nm<br>Rin = 100 nm<br>Rin = 230 nm | 330 nm | Rin = 70 nm, Rth = −90 nm<br>Rin = 70 nm, Rth = −120 nm<br>Rin = 90 nm, Rth = −100 nm<br>Rin = 90 nm, Rth = −120 nm<br>Rin = 90 nm, Rth = −150 nm<br>Rin = 110 nm, Rth = −80 nm<br>Rin = 110 nm, Rth = −120 nm<br>Rin = 110 nm, Rth = −150 nm | Rth = 80 nm<br>Rth = 100 nm<br>Rth = 50 nm<br>Rth = 90 nm<br>Rth = 110 nm<br>Rth = 55 nm<br>Rth = 70 nm<br>Rth = 130 nm | B film + C film (+zero TAC film) | 48:1 |
| Zero COP or zero TAC film | Rin = 90 nm<br>Rin = 70 nm<br>Rin = 80 nm<br>Rin = 50 nm<br>Rin = 50 nm<br>Rin = 40 nm<br>Rin = 70 nm | | Rin = 110 nm, Rth = −150 nm<br>Rin = 110 nm, Rth = −120 nm<br>Rin = 110 nm, Rth = −80 nm<br>Rin = 90 nm, Rth = −150 nm<br>Rin = 90 nm, Rth = −120 nm<br>Rin = 70 nm, Rth = −90 nm<br>Rin = 90 nm, Rth = −75 nm | Rth = 125 nm<br>Rth = 100 nm<br>Rth = 70 nm<br>Rth = 132 nm<br>Rth = 110 nm<br>Rth = 90 nm<br>Rth = 110 nm | | 52:1 |

TABLE 4-continued

| Internal protective film of 1st polarizing plate | IPS-LCD | Retardation value of B film | Retardation value of C film | Internal protective film of 2nd polarizing plate | Minimum contrast ratio |
|---|---|---|---|---|---|
| Zero COP or zero TAC film | | Rin = 110 nm, Rth = −150 nm<br>Rin = 110 nm, Rth = −120 nm<br>Rin = 90 nm, Rth = −150 nm<br>Rin = 90 nm, Rth = −150 nm | Rth = 140 nm<br>Rth = 120 nm<br>Rth = 140 nm<br>Rth = 150 nm | | 30:1 |

Fifth Embodiment

In the IPS-LCD of the fifth embodiment, as shown in FIG. 8, the biaxial film 17 was made of stretched COP, which has an in-plane retardation value (Rin) of 90 nm and a thickness retardation value (Rth(550 nm)) of −75 nm. The internal protective film of the first polarizing plate 1 was a zero COP film or a zero TAC film. An A film 13, which has a thickness of 100 μm and in-plane retardation value(Rin) of 70 nm, is inserted between the first polarizing plate 1 and IPS panel 3. The internal protective film of the second polarizing plate 2 was replaced with a phase retardation film obtained by coating the upper surface the biaxial film 17 with the C film 11, which has a thickness retardation value (Rth) of 110 nm. When the above obtained phase retardation film and the polarizing plates 1 and 2 were applied to an IPS-LCD, the simulated minimum contrast ratios of a tilt angle of 75° to all azimuthal angles in the IPS-LCD were 48:1~52:1. After the Sixth Embodiment In the EPS-LCD of the sixth embodiment, as shown in FIG. 9, the uniaxial A film 12 adjacent to the first polarizing plate 1 was made of stretched COP, which has an in-plane retardation value (Rin) of 160 nm, and the uniaxial A film 14 adjacent to the second polarizing plate 2 was made of stretched COP, which has an in-plane retardation value (Rin) of 130 nm. The internal protective film of the first polarizing plate 1 was a TAC film, which has a thickness of 50 μm and a thickness retardation value (Rth) of −32 nm. The internal protective film of the second polarizing plate 2 was replaced with a phase retardation film obtained by coating the upper surface of the uniaxial A film 14 with the C film 11, which has a thickness retardation value (Rth) of 110 nm. When the above phase retardation film and the polarizing plates 1 and 2 were applied to an IPS-LCD, the simulated minimum contrast ratios of a tilt angle of 75° to all azimuthal angles in the IPS-LCD were 45:1~55:1. A film made of zero TAC without a retardation value may be additionally stacked on the second polarizing plate 2.

FIG. 15B illustrates contrast characteristics of tilt angles of 0~80° to all azimuthal angles under the above conditions.

Below Table 6 states simulated results showing viewable angle characteristics at a tilt angle of 75° according to retardation values of the internal protective film and the phase retardation film in the structure of the IPS-LCD of the sixth embodiment.

TABLE 6

| Internal protective film of 1st polarizing plate | Retardation value of A film (1st polarizing plate side) | IPS-LCD | Retardation value of A film | Retardation value of C film | Internal protective film of 2nd polarizing plate | Minimum contrast ratio |
|---|---|---|---|---|---|---|
| TAC film having thickness of 50 μm | Rin = 100 nm<br>Rin = 80 nm<br>Rin = 160 nm<br>Rin = 180 nm<br>Rin = 100 nm<br>Rin = 160 nm | 330 nm | Rin = 110 nm<br>Rin = 120 nm<br>Rin = 130 nm<br>Rin = 140 nm<br>Rin = 90 nm<br>Rin = 130 nm | Rth = 66 nm<br>Rth = 55 nm<br>Rth = 100 nm<br>Rth = 88 nm<br>Rth = 77 nm<br>Rth = 110 nm | A film + C film (+zero TAC film) | 45:1 |
| Zero COP or zero TAC film | Rin = 50 nm<br>Rin = 100 nm<br>Rin = 200 nm | | Rin = 110 nm<br>Rin = 130 nm<br>Rin = 150 nm | Rth = 88 nm<br>Rth = 100 nm<br>Rth = 100 nm | | 55:1 |

Seventh Embodiment

In the IPS-LCD of the seventh embodiment, as shown in FIG. 10, the uniaxial A film 12 adjacent to the first polarizing plate 1 was made of stretched COP, which has an in-plane retardation value (Rin) of 160 nm, and the uniaxial A film 14 adjacent to the second polarizing plate 2 was made of stretched COP, which has an in-plane retardation value (Rin (550 nm)) of 130 nm. The internal protective film of the first polarizing plate 1 was a TAC film, which has a thickness of 50 μm and a thickness retardation value (Rth) of −32 nm. The internal protective film of the second polarizing plate 2 was replaced with a phase retardation film obtained by coating the upper surface of the uniaxial A film 14 with the C film 11, which has a thickness retardation value (Rth) of 110 nm. When the above obtained phase retardation film and the polarizing plates 1 and 2 were applied to an IPS-LCD, the simulated minimum contrast ratios of a tilt angle of 75° to all azimuthal angles in the IPS-LCD were 40:1~48:1. A film made of zero TAC without a retardation value may be additionally stacked on the second polarizing plate 2.

Figure 16:
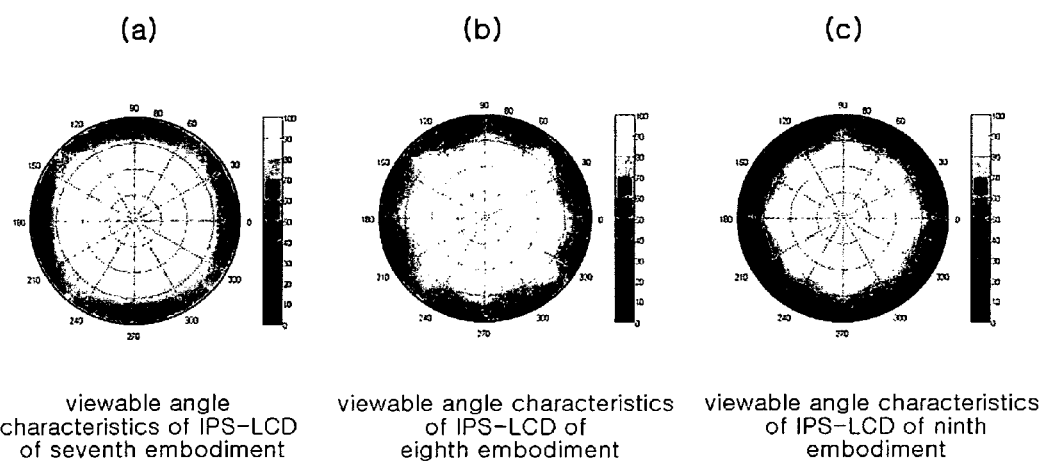
FIGS. 16A to 16C are views illustrating viewable angle characteristics of the IPS-LCDs in accordance with the seventh to ninth embodiments, as shown in FIGS. 10 to 12.

FIG. 16A illustrates contrast characteristics of tilt angles of 0~80° to all azimuthal angles under the above conditions.

Below Table 7 states simulated results showing viewable angle characteristics at a tilt angle of 75° according to retardation values of the internal protective film and the phase retardation film in the structure of the IPS-LCD of the seventh embodiment.

Eighth Embodiment

In the IPS-LCD of the eighth embodiment, as shown in FIG. 11, the uniaxial A film 12 adjacent to the first polarizing plate 1 was made of stretched COP, which has an in-plane retardation value (Rin(550 nm)) of 150 nm, and the uniaxial A film 14 adjacent to the second polarizing plate 2 was made of stretched COP, which has an in-plane retardation value (Rin(550 nm)) of 150 nm. The internal protective film of the first polarizing plate 1 was a zero COP film or a zero TAC film. The internal protective film of the second polarizing plate 2 was replaced with a phase retardation film obtained by coating the uniaxial A film 14 with the C film 11 having thickness retardation value of 110 nm. When the above obtained phase retardation film and the polarizing plates 1 and 2 were applied to an IPS-LCD, the simulated minimum contrast ratios of a tilt angle of 75° to all azimuthal angles in the IPS-LCD were 32:1~38:1.

FIG. 16B illustrates contrast characteristics of tilt angles of 0~80° to all azimuthal angles under the above conditions.

Below Table 8 states simulated results showing viewable angle characteristics at a tilt angle of 75° according to retardation values of the internal protective film and the phase retardation film in the structure of the IPS-LCD of the eighth embodiment.

TABLE 7

| Internal protective film of 1st polarizing plate | Retardation value of A film (1st polarizing plate side) | IPS-LCD | Retardation value of A film | Retardation value of C film | Internal protective film of 2nd polarizing plate | Minimum contrast ratio |
|---|---|---|---|---|---|---|
| TAC film having thickness of 50 μm | Rin = 240 nm<br>Rin = 240 nm<br>Rin = 220 nm<br>Rin = 200 nm<br>Rin = 180 nm<br>Rin = 160 nm | 300 nm | Rin = 140 nm<br>Rin = 130 nm<br>Rin = 120 nm<br>Rin = 110 nm<br>Rin = 90 nm<br>Rin = 130 nm | Rth = 110 nm<br>Rth = 120 nm<br>Rth = 100 nm<br>Rth = 100 nm<br>Rth = 100 nm<br>Rth = 110 nm | A film + C film (+zero TAC film) | 40:1 |
| Zero COP or zero TAC film | Rin = 30 nm<br>Rin = 30 nm | | Rin = 110 nm<br>Rin = 130 nm | Rth = 90 nm<br>Rth = 110 nm | | 48:1 |

TABLE 8

| Internal protective film of 1st polarizing plate | Retardation value of A film (1st polarizing plate side) | IPS-LCD | Retardation value of C film | Retardation value of A film | Internal protective film of 2nd polarizing plate | Minimum contrast ratio |
|---|---|---|---|---|---|---|
| Zero COP or zero TAC film | Rin = 160 nm<br>Rin = 150 nm | 330 nm | Rth = 90 nm<br>Rth = 110 nm | Rin = 150 nm<br>Rin = 150 nm | A film + C film (+zero TAC) | 38:1 |
| TAC film having thickness of 50 μm | Rin = 150 nm | | Rth = 100 nm | Rin = 120 nm | | 32:1 |

Ninth Embodiment

In the IPS-LCD of the ninth embodiment, as shown in FIG. 12, the uniaxial A film 12 adjacent to the first polarizing plate 1 was made of stretched COP, which has an in-plane retardation value (Rin(550 nm)) of 140 nm, and the uniaxial A film 14 adjacent to the second polarizing plate 2 was made of stretched COP, which has an in-plane retardation value (Rin (550 nm)) of 110 nm. The internal protective film of the first polarizing plate 1 was a TAC film, which has a thickness of 50 μm and a thickness retardation value (Rth) of −32 nm. The internal protective film of the second polarizing plate 2 was replaced with a phase retardation film obtained by coating the uniaxial A film 14 with the C film 11 having thickness retardation value of 100 nm. When the above obtained phase retardation film and the polarizing plates 1 and 2 were applied to an IPS-LCD, the simulated minimum contrast ratios of a tilt angle of 75° to all azimuthal angles in the IPS-LCD were 25:1~30:1.

FIG. 16C illustrates contrast characteristics of tilt angles of 0~80° to all azimuthal angles under the above conditions.

Below Table 9 states simulated results showing viewable angle characteristics at a tilt angle of 75° according to retardation values of the internal protective film and the phase retardation film in the structure of the IPS-LCD of the ninth embodiment.

polarizing plates were manufactured, and contrast characteristics of IPS-LCDs were measured and compared with each other under the conditions in accordance with below embodiments.

First, IPS-LCDs in accordance with tenth to fourteenth embodiments of the present invention, which use a phase retardation film, obtained by coating a negative biaxial film with a uniaxial C film as the internal protective film of the second polarizing plate, were analyzed.

Tenth Embodiment

Figure 17:
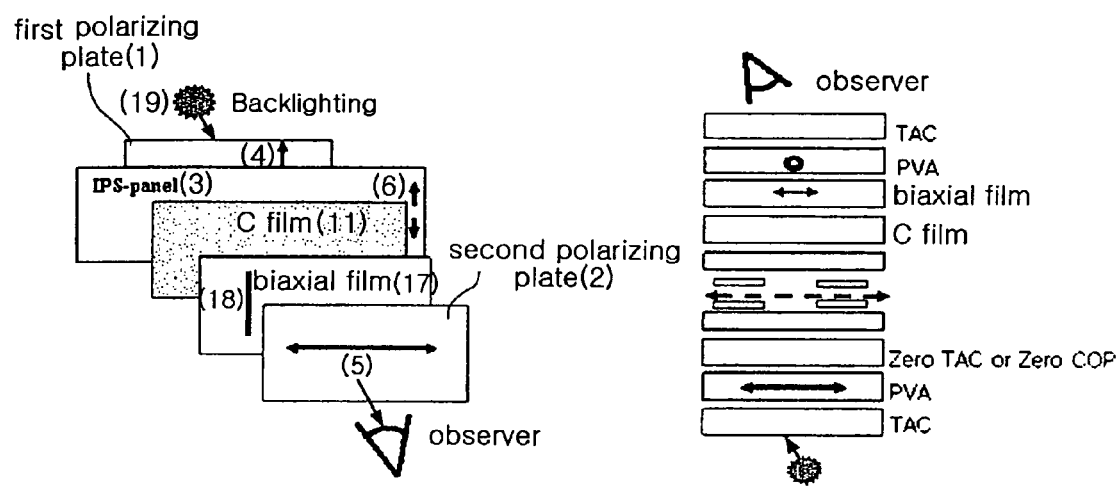
FIG. 17 is a view illustrating a structure of an IPS-LCD, which uses a zero COP film or a zero TAC film as an internal protective film of a first polarizing plate, and has a second phase retardation film, obtained by coating a biaxial film with a uniaxial C film, in accordance with a tenth embodiment of the present invention.

The IPS-LCD of the tenth embodiment, as shown in FIG. 17, was manufactured, and contrast characteristics of the IPS-LCD were measured. In the IPS-LCD of the tenth embodiment, the internal protective film of the first polarizing plate 1 was made of zero COP or zero TAC. The internal protective film of the second polarizing plate 2 was replaced with a phase retardation film obtained by coating the biaxial film 17, which has a thickness of 80 μm, an in-plane retardation value (Rin) of 90 nm, and a thickness retardation value (Rth) of −75 nm, with the C film 11, which has a thickness retardation value (Rth) of 140 nm.

Eleventh Embodiment

Figure 18:
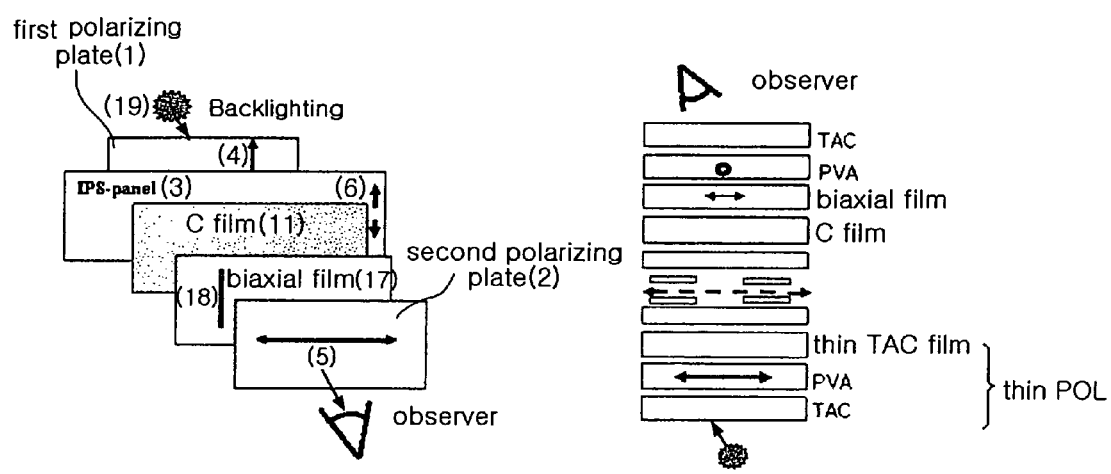
FIG. 18 is a view illustrating a structure of an IPS-LSCD, which has the same structure as that of the IPS-LCD of FIG. 17 and uses a TAC film having a thickness retardation value of −30~−40 nm as an internal protective film of a first polarizing plate, in accordance with an eleventh embodiment of the present invention.

The IPS-LCD of the eleventh embodiment, as shown in FIG. 18, was manufactured, and contrast characteristics of the

TABLE 9

| Internal protective film of 1st polarizing plate | Retardation value of A film (1st polarizing plate side) | IPS-LCD | Retardation value of C film | Retardation value of A film | Internal protective film of 2nd polarizing plate | Minimum contrast ratio |
|---|---|---|---|---|---|---|
| Zero COP or zero TAC | Rin = 350 nm<br>Rin = 120 nm | 330 nm | Rth = 115 nm<br>Rth = 130 nm | Rin = 140 nm<br>Rin = 150 nm | A film + C film | 30:1 |
| TAC having thickness of 50 μm | Rin = 180 nm<br>Rin = 130 nm<br>Rin = 110 nm<br>Rin = 80 nm<br>Rin = 140 nm | | Rth = 160 nm<br>Rth = 130 nm<br>Rth = 160 nm<br>Rth = 140 nm<br>Rth = 100 nm | Rin = 150 nm<br>Rin = 130 nm<br>Rin = 110 nm<br>Rin = 90 nm<br>Rin = 110 nm | | 25:1 |

As described above, all the IPS-LCDs, in which the protective film of a polarizing plate is replaced with a phase retardation film, had a high contrast ratio of more than 25:1. Particularly, the IPS-LCD, which uses a zero TAC film, had a higher contrast ratio than that of the IPS-LCD, which does not use the zero TAC film. In order to confirm the above fact, IPS-LCD were measured. In the IPS-LCD of the eleventh embodiment, the internal protective film of the first polarizing plate 1 was a thin TAC film, which has a thickness retardation value (Rth) of −30 nm. The internal protective film of the second polarizing plate 2 was replaced with a phase retardation film obtained by coating the biaxial film 17, which has a thickness of 80 μm, an in-plane retardation value (Rin) of 90 nm, and a thickness retardation value (Rth) of −75 nm, with the C film 11, which has a thickness retardation value (Rth) of 140 nm.

Twelfth Embodiment

Figure 19:
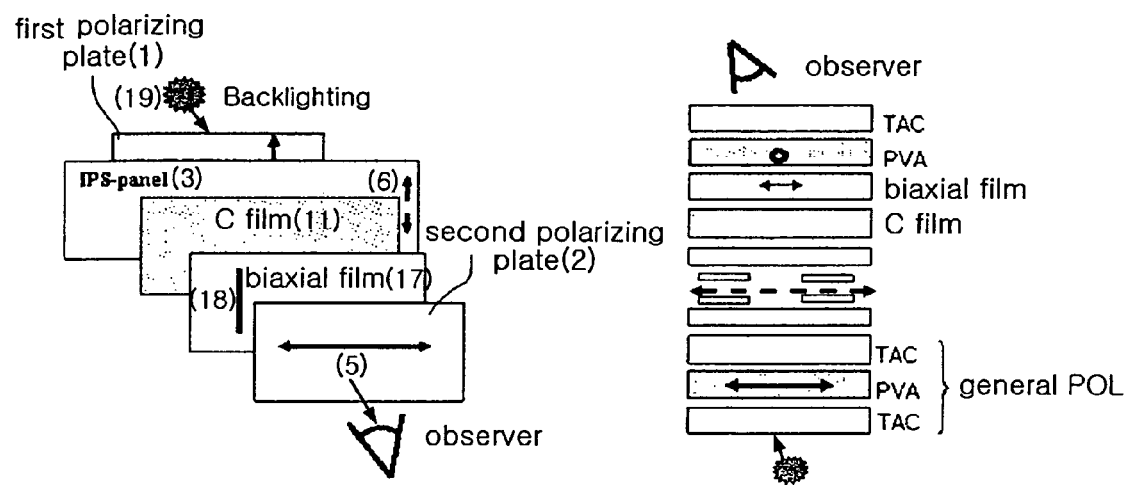
FIG. 19 is a view illustrating a structure of an IPS-LSCD, which has the same structure as that of the IPS-LCD of FIG. 17 and uses a general TAC film having a thickness retardation value of −55~−65 nm as an internal protective film of a first polarizing plate, in accordance with a twelfth embodiment of the present invention.

The IPS-LCD of the twelfth embodiment, as shown in FIG. 19, was manufactured, and contrast characteristics of the IPS-LCD were measured. In the IPS-LCD of the twelfth embodiment, the internal protective film of the first polarizing plate 1 was a general TAC film, which has a thickness retardation value (Rth) of −60 nm. The internal protective film of the second polarizing plate 2 was replaced with a phase retardation film obtained by coating the biaxial film 17, which has a thickness of 80 μm, an in-plane retardation value (Rin) of 90 nm, and a thickness retardation value (Rth) of −75 nm, with the C film 11, which has a thickness retardation value (Rth) of 140 nm.

Thirteenth Embodiment

Figure 20:
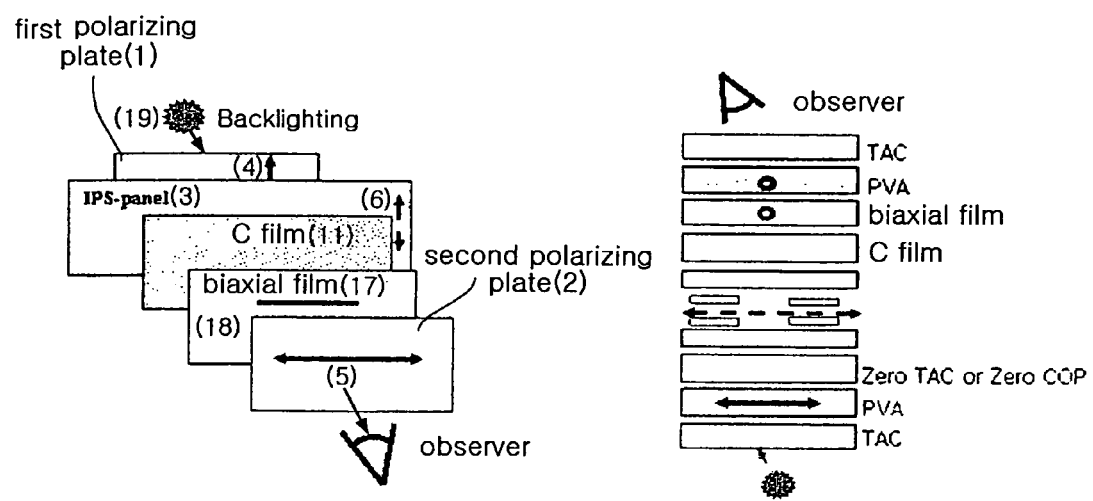
FIG. 20 is a view illustrating a structure of an IPS-LCD, which has the same structure as that of the IPS-LCD of FIG. 17 except that an optical axis of a second internal protective film and an absorption axis of a second polarizing plate are parallel with each other, in accordance with a thirteenth embodiment of the present invention.

The IPS-LCD of the thirteenth embodiment, as shown in FIG. 20, was manufactured, and contrast characteristics of the IPS-LCD were measured. In the IPS-LCD of the thirteenth embodiment, the internal protective film of the first polarizing plate 1 was a zero TAC film, which does not have a retardation value. The internal protective film of the second polarizing plate 2 was replaced with a phase retardation film obtained by coating the biaxial film 17, which is provided with an optical axis parallel with the absorption axis of the second polarizing plate 2 and has a thickness of 80 μm, an in-plane retardation value (Rin) of 90 nm, and a thickness retardation value (Rth) of −75 nm, with the C film 11, which has a thickness retardation value (Rth) of 140 nm.

Fourteenth Embodiment

Figure 21:
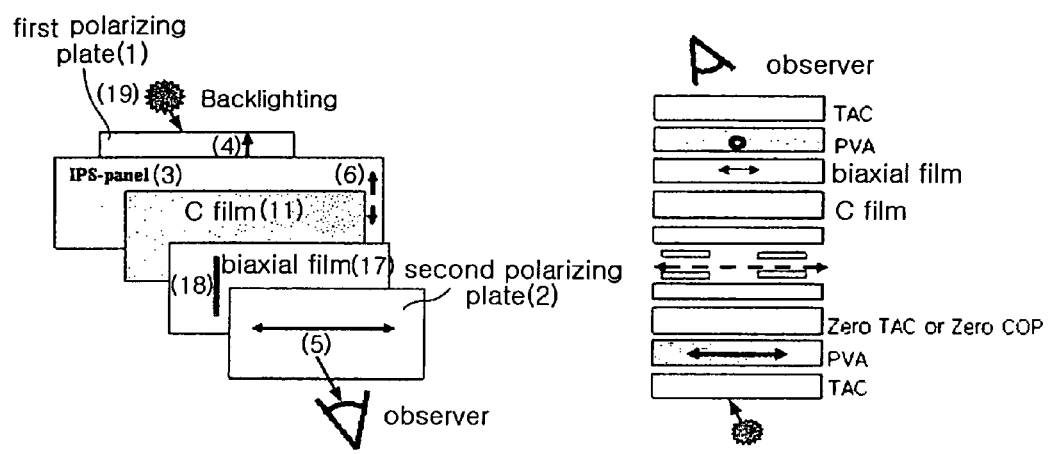
FIG. 21 is a view illustrating a structure of an IPS-LCD, which has the same structure as that of the IPS-LCD of FIG. 17 except that retardation values of a biaxial film and a C film of a second internal protective film deviate from the range regulated by the present invention, in accordance with a fourteenth embodiment of the present invention.

The EPS-LCD of the fourteenth embodiment, as shown in FIG. 21, was manufactured, and contrast characteristics of the IPS-LCD were measured. In the IPS-LCD of the fourteenth embodiment, the internal protective film of the first polarizing plate 1 was a zero TAC film, which does not have a retardation value. The internal protective film of the second polarizing plate 2 was replaced with a phase retardation film obtained by coating the upper surface of the biaxial film 17, which has a thickness of 80 μm, an in-plane retardation value (Rin) of 60 nm, and a thickness retardation value (Rth) of −170 nm, with the C film 11, which has a thickness retardation value (Rth) of 220 nm.

Fifteenth Embodiment

Figure 22:
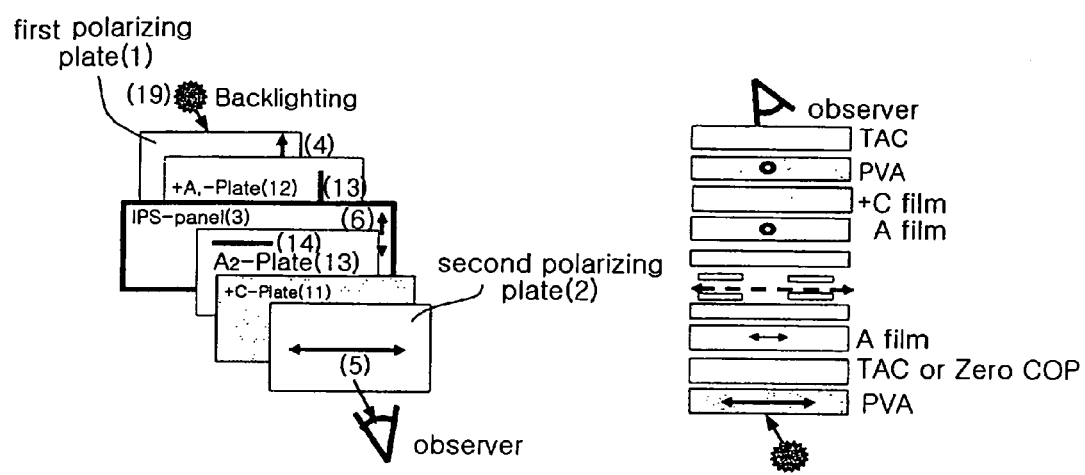
FIG. 22 is a view illustrating a structure of an IPS-LCD, which has a uniaxial A film, interposed between an internal protective film of a first polarizing plate and an IPS panel, and a second internal protective film including a uniaxial A film and a uniaxial C film, which are sequentially stacked, in accordance with a fifth embodiment of the present invention.

The IPS-LCD of the fifteenth embodiment, as shown in FIG. 22, was manufactured, and contrast characteristics of the IPS-LCD were measured. In the IPS-LCD of the fifteenth embodiment, the internal protective film of the first polarizing plate 1 was a zero TAC film, which does not have a retardation value, and the A film 12, which has a thickness of 110 μm and an in-plane retardation value (Rin) of 100 nm, was located between the internal protective film of the first polarizing plate 1 and the IPS-panel 3. The internal protective film of the second polarizing plate 2 was replaced with a phase retardation film obtained by coating the upper surface of the uniaxial A film 14, which has a thickness of 100 μm and an in-plane retardation value (Rin) of 130 nm, with the C film 11, which has a thickness retardation value (Rth) of 100 nm.

In all the above embodiments, the C film has a thickness of 1~2 μm.

FIGS. 23A to 23F illustrate measured results of contrast ratios of the IPS-LCDs, in accordance with the tenth to fifteenth embodiments. The measured values were similar to the above simulated results, and had the tendency similar as the simulated results, although a small difference between the measured values and the simulated results exists.

Figure 23:
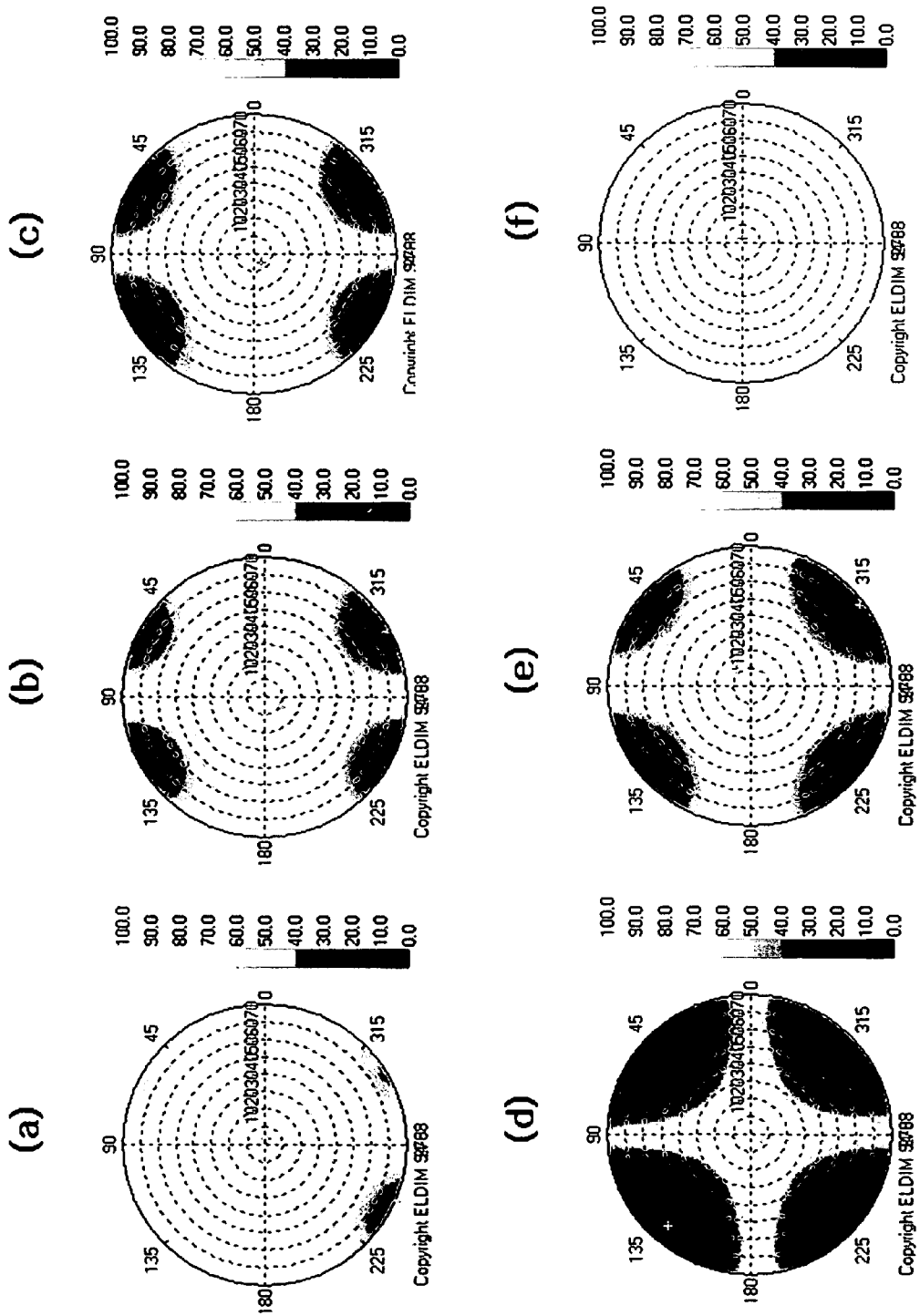
FIGS. 23A to 23F are views illustrating distributions of contrast ratios of the IPS-LCDs, as shown in FIGS. 17 to 22.

FIG. 23A illustrates the measured results of the contrast ratios of the IPS-LCD of the tenth embodiment, which uses the zero TAC film as the protective film of the first polarizing plate. In the IPS-LCD, the region having the highest contrast ratio is distributed throughout the Poincare sphere. Accordingly, the IPS-LCD exhibited high contrast ratios at all viewable angles.

FIG. 23B illustrates the measured results of the contrast ratios of the IPS-LCD of the eleventh embodiment, which uses the same polarizing plates as those of the IPS-LCD of the tenth embodiment except for the thin TAC film having a thickness retardation value (Rth) of −30 nm used as the protective film of the first polarizing plate. The IPS-LCD generally exhibited high contrast ratios, but low contrast ratios of less than 20:1 in some regions at azimuthal angles of 240° and 340°. Accordingly, the IPS-LCD of the eleventh embodiment exhibited comparatively high contrast ratios, although the contrast ratios of the IPS-LCD of the eleventh embodiment are not satisfactory compared to the IPS-LCD of the tenth embodiment.

FIG. 23C illustrates the measured results of the contrast ratios of the IPS-LCD of the twelfth embodiment, which uses the same polarizing plates as those of the IPS-LCD of the tenth embodiment except for the general TAC film having a thickness retardation value (Rth) of −60 nm used as the protective film of the first polarizing plate. The IPS-LCD had the region exhibiting low contrast ratios, which is broader than that of the IPS-LCD of the eleventh embodiment.

FIG. 23D illustrates the measured results of the contrast ratios of the IPS-LCD of the thirteenth embodiment, which uses the same conditions as those of the IPS-LCD of the tenth embodiment except that the optical axis of the biaxial film is parallel with the absorption axis of the second polarizing plate. The IPS-LCD of the thirteenth embodiment exhibited low contrast ratios, compared to the IPS-LCDs of other embodiments. Accordingly, it was confirmed that the dispositional direction of each of the films is an important factor for determining the contrast ratio.

FIG. 23E illustrates the measured results of the contrast ratios of the IPS-LCD of the fourteenth embodiment, which uses the zero TAC film as the protective film of the first polarizing plate, identically with the IPS-LCD of the tenth embodiment, but uses the biaxial film of the phase retardation film having a thickness retardation value being lower than the value regulated by the present invention, as the internal protective film of the second polarizing plate. The IPS-LCD of the fourteenth embodiment exhibited contrast ratios, which are higher than those of the IPS-LCD of the twelfth embodiment using the general TAC, but are lower than those of the IPS-LCDs of the tenth and eleventh embodiments, which have the most preferable condition. Accordingly, it was confirmed that the control of the retardation values of each of film layers of the phase retardation film is another important factor for determining the contrast ratio.

FIG. 23F illustrates the measured results of the contrast ratios of the IPS-LCD of the fifteenth embodiment, which uses the A film and the C film as the internal protective film of the second polarizing plate. As shown in FIG. 23F, the IPS- LCD of the fifteen embodiment exhibited high contrast ratios, similarly to the IPS-LCD of the tenth embodiment.

INDUSTRIAL APPLICABILITY

As apparent from the above description, the present invention provides an in-plane switching liquid crystal display (IPS-LCD), which uses a second phase retardation film exhibiting a broad viewable angle property as a protective film of one polarizing plate. The IPS-LCD of the present invention has a thin profile and a simple structure, and causes the reduction of the production costs thereof.

The conventional IPS-LCD having upper and lower protective films exhibits a contrast ratio of 10:1~45:1. On the other hand, the IPS-LCD of the present invention exhibits a contrast ratio of 25:1~55:1. Accordingly, the IPS-LCD of the present invention has a simple structure and exhibits a reasonably high contrast ratio.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An in-plane switching liquid crystal display (IPS-LCD) comprising
a first polarizing plate, a second polarizing plate, an horizontally oriented IPS panel disposed between the first and second polarizing plates and filled with a liquid crystal having positive dielectric constant anisotropy ($\Delta\epsilon>0$), and a first protective film disposed between the first polarizing plate and the IPS panel, in which an absorption axis of the first polarizing plate and an absorption axis of the second polarizing plate are orthogonal to each other, and an optical axis of the liquid crystal in the IPS panel and the absorption axis of the first polarizing plate are parallel with each other, wherein a phase retardation film, obtained by coating a biaxial film with a uniaxial C film, is disposed between the second polarizing plate and the IPS panel and is used as a second protective film between the IPS panel and the second polarizing plate.

2. The IPS-LCD according to claim 1, further comprising another phase retardation film including a uniaxial A film and disposed between the IPS panel and the first polarizing film.

3. The IPS-LCD according to claim 2, wherein the phase retardation film including the uniaxial A film which is disposed at the first polarization film has an in-plane retardation value (Rin) of 30~450$^{nm}$, the biaxial film of the phase retardation film disposed at the second polarization film has an in-plane retardation value (Rin) of 50~150$^{nm}$ and a thickness retardation value (Rth) of −50~50$^{nm}$, and the uniaxial C film of the phase retardation film disposed at the second polarization film has a thickness retardation value (Rth) of 50~170$^{nm}$, said retardation values denoting retardation values at a wavelength of 550$^{nm}$.

4. An in-plane switching liquid crystal display (IPS-LCD) comprising a first polarizing plate, a second polarizing plate, horizontally oriented IPS panel disposed between the first and second polarizing plates and filled with a liquid crystal having positive dielectric constant anisotropy ($\Delta\epsilon>0$), and a first protective film disposed between the first polarizing plate and the IPS panel, in which an absorption axis of the first polarizing plate and an absorption axis of the second polarizing plate are orthogonal to each other, and an optical axis of the liquid crystal in the IPS panel and the absorption axis of the first polarizing plate are parallel with each other,
wherein a phase retardation film, obtained by coating a uniaxial A film with a uniaxial C film, is disposed between the second polarizing plate and the IPS panel and is used as a second protective film between the IPS panel and the second polarizing plate, and a first phase retardation film including a uniaxial A film is disposed between the IPS panel and the first polarizing film.

5. The IPS-LCD according to claim 4, wherein the phase retardation film including the uniaxial A film which is disposed at the first polarization film has an in-plane retardation value (Rin) of 30~450$^{nm}$, the uniaxial A film of the phase retardation film disposed at the second polarization film has an in-plane retardation value (Rin) of 80~450$^{nm}$, and the uniaxial C film of the phase retardation film disposed at the second polarization film has a thickness retardation value (Rth) of 50~170$^{nm}$, said retardation values denoting retardation values at a wavelength of 550$^{nm}$.

6. The IPS-LCD according to claim 2 or 4, wherein an optical axis of the phase retardation film disposed at the first polarization film in the direction of the X axis is parallel with the absorption axis of the first polarizing plate.

7. The IPS-LCD according to claim 1 or 4, wherein the first protective film is one film selected from the group consisting of a non-stretched zero COP film, a non-stretched zero TAC film, and a TAC film having a thickness of 50 μm and a thickness retardation value.

8. The IPS-LCD according to claim 7, wherein the first protective film is a non-stretched zero TAC film.

9. The IPS-LCD according to claim 2 or 4, wherein the uniaxial A film is made of lengthwise stretched polymer, the biaxial film is made of crosswise stretched polymer, and the uniaxial C film is obtained by coating an orientation film with a liquid crystal and hardening the liquid crystal coated on the orientation film.

\* \* \* \* \*